United States Patent [19]

Rowland-Hill et al.

[11] 4,018,232

[45] Apr. 19, 1977

[54] MATERIAL DISTRIBUTION MEANS FOR CONCAVE OF ROTARY COMBINE

[75] Inventors: Edward W. Rowland-Hill, Lancaster; Robert R. Todd, Leola, both of Pa.

[73] Assignee: Sperry Rand Corporation, New Holland, Pa.

[22] Filed: Apr. 1, 1976

[21] Appl. No.: 672,582

[52] U.S. Cl. .............................................. 130/27 T
[51] Int. Cl.² ..................... A01F 7/06; A01F 12/00
[58] Field of Search ............. 130/27 T, 27 R, 27 J, 130/27 K, 27 L, 27 P; 56/14.6

[56] References Cited

UNITED STATES PATENTS

| 3,589,111 | 6/1971 | Gullickson et al. | 56/12.8 |
| 3,645,270 | 2/1972 | Rowland-Hill | 130/27 T |
| 3,742,686 | 7/1973 | Rowland-Hill | 56/12.9 |

*Primary Examiner*—Russell R. Kinsey
*Attorney, Agent, or Firm*—C. Hercus Just; Frank A. Seemar; John R. Flanagan

[57] ABSTRACT

A mobile combine having longitudinally extending rotor and concave threshing and separating members and a grain pan beneath the threshing and separating members to receive threshed and semi-threshed crop material incident to transmitting said material to a sieve mechanism. In order to prevent uneven build up or deposit of said material in localized areas upon the grain pan, deflecting members are provided in several different embodiments or arrangements which are fixed to the threshing and/or the separating members, all having the common objective of deflecting material discharged from the threshing and separating areas of the grain pan which normally have low accumulation and thereby tend to cause substantially even distribution of said material upon the grain pan.

17 Claims, 8 Drawing Figures

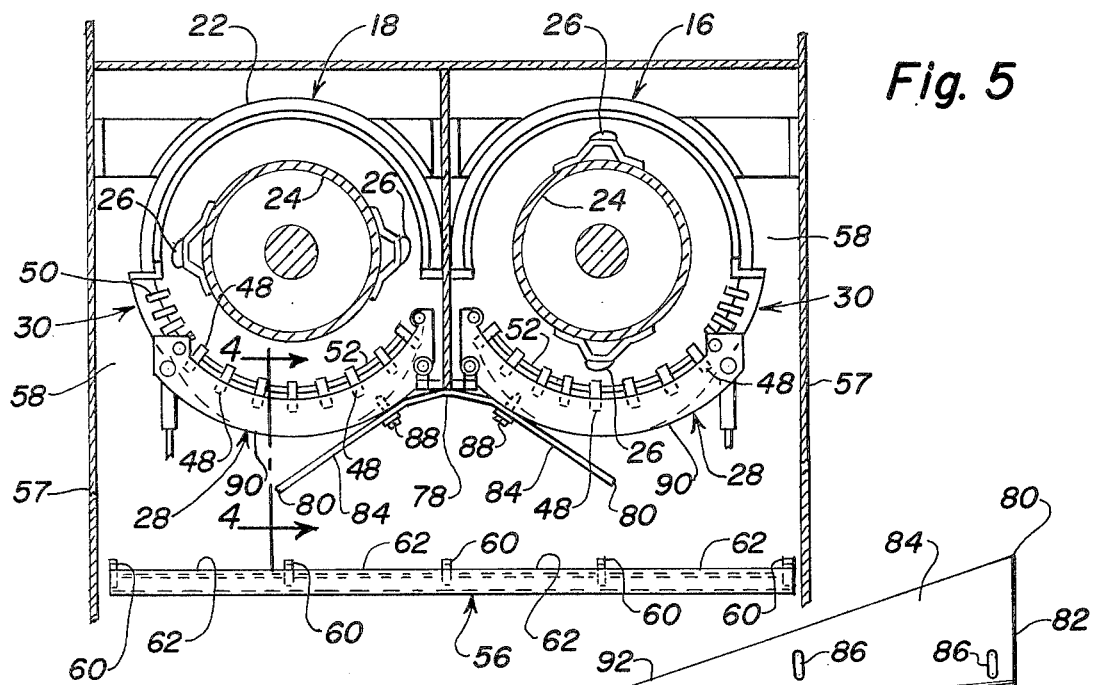
Fig. 5
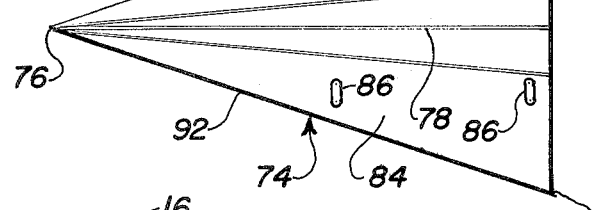
Fig. 6
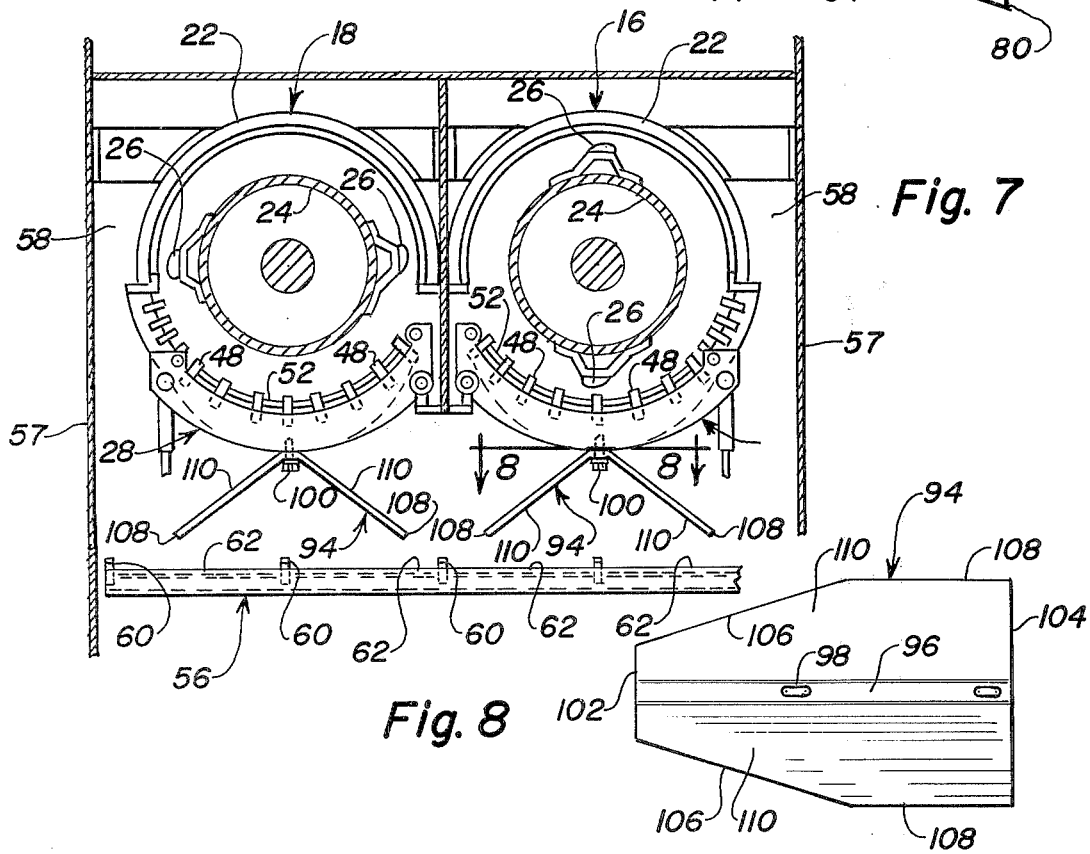
Fig. 7
Fig. 8

MATERIAL DISTRIBUTION MEANS FOR CONCAVE OF ROTARY COMBINE

BACKGROUND OF THE INVENTION

The present invention pertains to a rotary combine preferably of the type having axially extending threshing and separating means comprising rotors coacting with concave grates and, more particularly, the invention pertains to combines having a pair of threshing and separating units respectively comprising a rotor and complementary concave and grates in side-by-side relationship. The combine also preferably is of the mobile type having a header on the forward end for purposes of cutting and consolidating crop material to be threshed by the combine, said header delivering a substantially steady stream of said cut material to an elevator which moves the consolidated crop material to the threshing means of the combine which comprises the side-by-side threshing units referred to above.

The threshing units thresh the material supplied thereto and the threshed and some partially threshed material is discharged through a grid-like pattern of openings in the concave and grate onto a material cleaning mechanism comprising a grain pan which extends transversely between opposite sides of the combine below said threshing and separating unit and extending from the forward end of a threshing unit rearwardly for discharge onto sieve mechanism which further separates the desired crop material from waste material such as chaff and the like.

In the preferred construction of the grain pan, which is horizontally disposed and extends between opposite sides of the combine at least beneath the major forward portion of the threshing units, a series of longitudinally extending divider strips in it are spaced transversely across said pan to define a series of shallow channels which extend longitudinally along the grain pan and the rearward, discharge ends thereof discharge threshed and possibly a limited amount of partially threshed material onto the sieve mechanism. It has been found in operation of combines of this type that greater efficiency is achieved if the material discharged from the threshing unit is distributed substantially evenly transversely across the grain pan but the threshing units of conventional combines of the type to which the present invention pertains have not effected such even distribution of threshed and partially threshed material onto the grain pan to the degree desired for maximum efficiency.

The present invention pertains to combines of the type employing a pair of threshing units arranged in side-by-side relationship such as shown for example in prior U.S. Pat. Nos. 3,626,472; issued Dec. 7, 1971, in the name of Rowland-Hill and No. 3,742,686, also in the name of Rowland-Hill and issued July 3, 1973.

Further, while the combines of the two aforementioned patents, which employ pairs of side-by-side threshing units are of the type to which the present invention pertains, combines having a single, longitudinally extending threshing and separating compartment and a coacting rotor means may employ, to advantage, principles of the present invention, a typical example of such single rotor of exemplary type being illustrated in prior U.S. Pat. No. 3,827,443, to Drayer, issued Aug. 6, 1974.

SUMMARY OF THE INVENTION

It is one of the primary objects of the present invention to provide deflecting mechanism mounted beneath the concaves of threshing units and/or the grates of separating units including coacting rotors, and supported directly by said concaves and/or grates, beneath the same, for purposes of causing the threshed crop material discharged through the reticulated openings in said concaves and grates onto said grain pan in a substantially even manner transversely between the opposite sides of said grain pan so as to effect maximum efficiency in the cleaning of said material by the sieve mechanism onto which the grain pan discharges the threshed material and a limited amount of semi-threshed material for separation of the desired threshed product material from the waste material such as chaff and other extraneous material such as portions of stalks, vines, etc., all of which waste material is discharged from the rearward end of the combine as it moves along a field, while the desired, completely threshed material, is moved by suitable elevator mechanism into a grain receptacle provided in the upper, central portion of the combine.

It is another object of the invention, to provide a plurality of different embodiments of deflecting mechanism for the purposes referred to above, all of which embodiments, have the common objective of achieving such desired, substantially even transverse distribution of material upon the grain pan for the purposes also recited hereinabove.

It is a further object of one embodiment of the invention to provide a pair of similarly disposed sheet-like deflecting members respectively supported at one end from the concave of each of a pair thereof, at locations spaced inwardly from the outer side edges of said concaves, said deflecting members extending downward and inward toward each other for discharge of threshed and any limited amount of semi-threshed material onto the central portions of a grain pan, while additional threshed and semi-threshed material is discharged onto the grain pans adjacent the outer side edges thereof, thereby effecting a substantially even distribution of threshed and a very limited amount of semi-threshed material onto the grain pan transversely across the entire width thereof.

It is still another object of the invention to provide a second embodiment of the invention in which a substantially triangularly shaped deflecting member, having an apex at the forward end thereof, is mounted with its central axis substantially coincident with a vertical plane between the pair of threshing units and the side edges of said deflecting member flaring outwardly and rearward with respect to each other and the side portions of said triangularly shaped deflecting member extending downward and outward is substantially spaced relationship to the opposite sides of said grain pan, thereby effecting a substantially even distribution of material onto said grain pan between opposite side edges thereof.

A still further object of the invention is to provide a third embodiment of the invention in which a pair of similar deflecting members respectively are connected to the concaves of said threshing units, preferably along the central longitudinal portion of each concave of said threshing units, said deflecting members being bent along the central, longitudinal axis thereof to provide a pair of opposite downwardly extending side portions, the outer side edges of which are spaced from the central longitudinal axis of the grain pan and also from the outer side edges of said grain pan, and the forward ends of said side portions of said deflecting members being narrower than the rear edges thereof and, in the preferred construction, the rearward portions of said side portions having parallel edges which are approximately half the longitudinal length of said member, all for purposes of effecting substantially even distribution of threshed and any limited amount of semi-threshed material onto said grain pan between the opposite side edges thereof.

Details of the foregoing objects and of the invention, as well as other objects thereof, are set forth in the following specification and illustrated in the accompanying drawings comprising a part thereof.

BRIEF DESCRIPTIONS OF THE DRAWINGS

Figure 2:
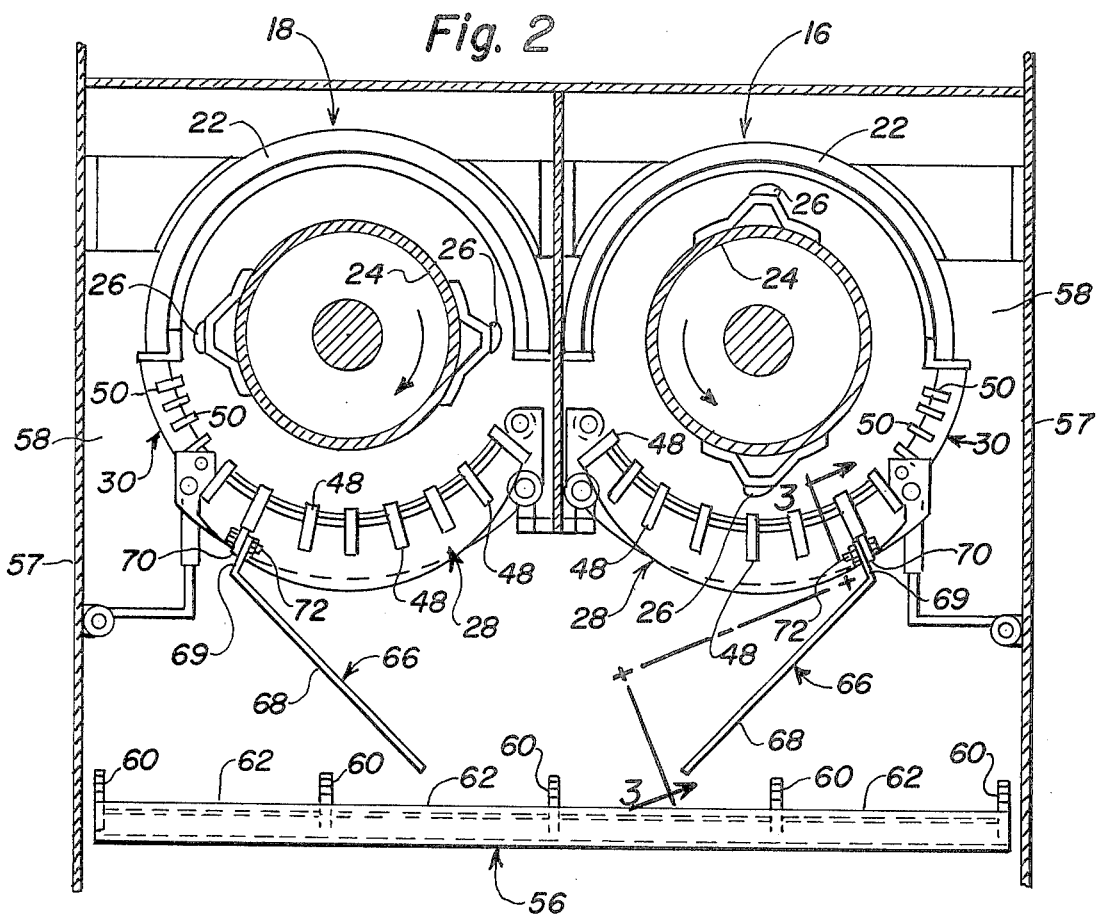
FIG. 2 is an enlarged vertical, fragmentary sectional view of the portion of the combine shown in FIG. 1 in which the principles of the present invention are embodied, said view being seen on the line 2—2 of FIG. 1.
Figure 3:
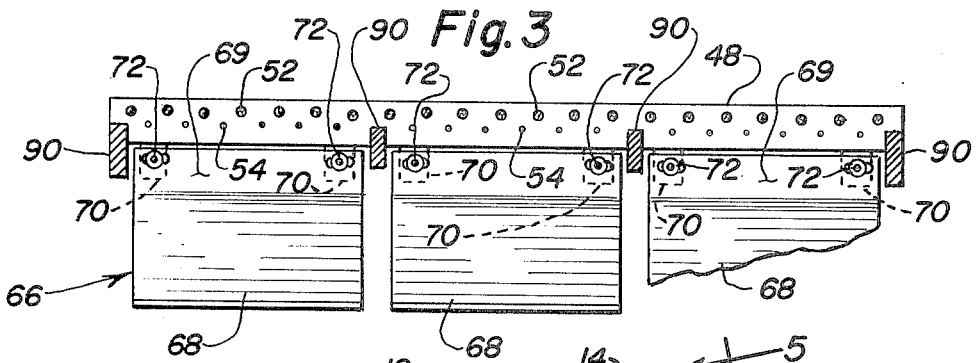
Figure 4:
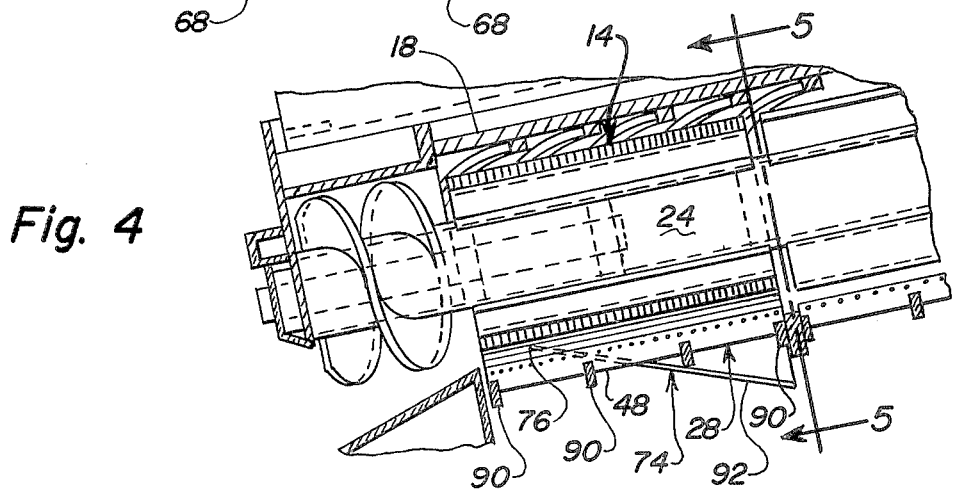

FIG. 3 is a fragmentary, longitudinal sectional view of said one embodiment of the invention as seen on the line 3—3 of FIG. 2. FIGS. 4, 5 and 6 respectively are a vertical, fragmentary longitudinal sectional view of the portion of the combine in which said embodiment of the invention is illustrated, FIG. 5 is a vertical sectional view of the fragmentary portion of the area of the combine shown in FIG. 4 as seen transversely to the view shown in FIG. 4 as seen on the line 4—4 of said figure, and FIG. 6 is a top plan view of the deflecting member included in the embodiment of the invention shown in FIGS. 4 and 5.

FIGS. 7 and 8 respectively are a vertical sectional view fragmentarily illustrating a still further embodiment of the invention, said view being similar to the views shown in FIGS. 2 and 5 of the two preceding embodiments of the invention and illustrating said third embodiment of the invention as seen from the rearward end thereof, while FIG. 8 is a plan view of the several deflecting members employed in the embodiment of the invention shown in FIG. 7, as seen on line 8—8 of FIG. 7.

DETAILED DESCRIPTION

Figure 1:
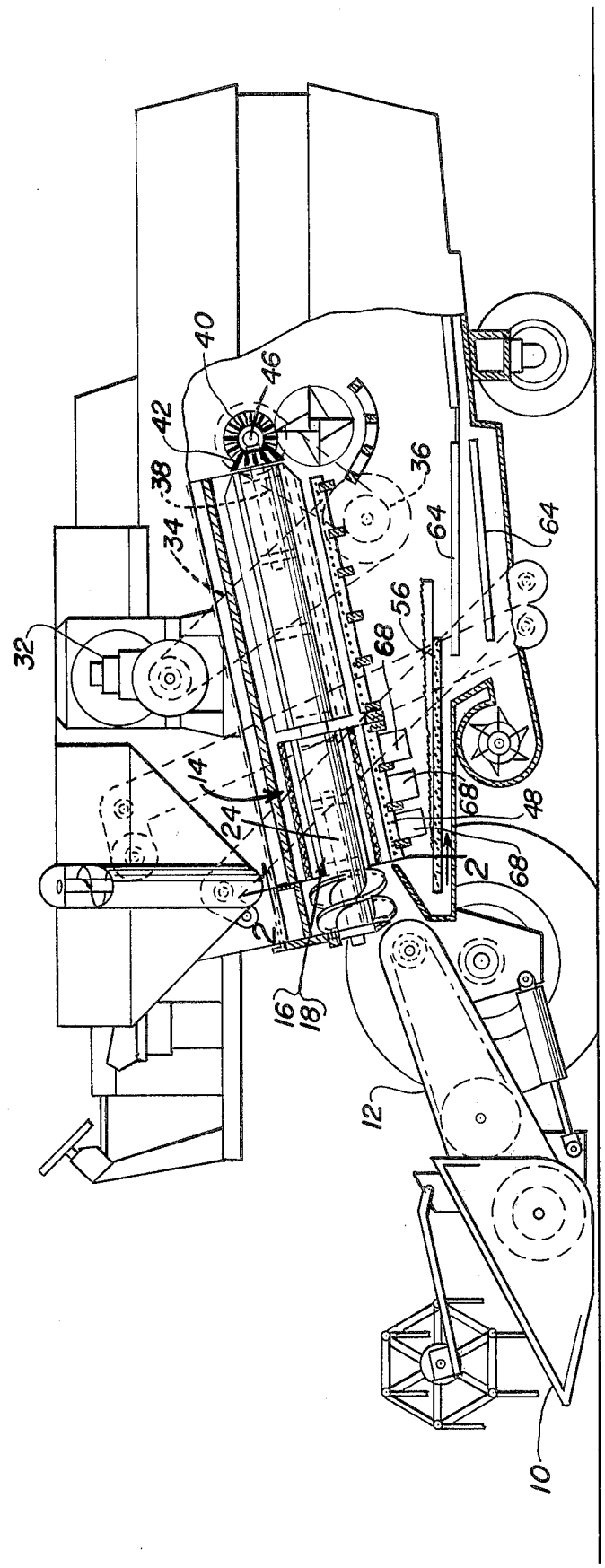
FIG. 1 is a side elevation of an exemplary rotary combine of the type to which the present invention pertains and one embodiment thereof being illustrated in said figure in fragmentary, vertically sectioned manner.

Referring to FIG. 1, it will be seen that the combine to which one embodiment of the present invention is applicable is shown in side elevation and critical portions thereof are illustrated in vertical sectional view in a fragmentary manner. Said combine is of the type having a header 10 of conventional type on the forward end thereof which cuts and consolidates crop material for delivery of a continuous stream thereof to the inlet end of an elevator 12 which also is of conventional type in the combine of the type to which the present invention pertains, typical examples of which are illustrated in particular in said aforementioned U.S. Pat. Nos. 3,626,472 and 3,742,686. The elevator moves said stream of cut and consolidated crop material which is to be threshed upward and rearward to the inlet end of a threshing compartment 14.

Referring to FIG. 2, it will be seen that the preferred type of threshing compartment to which the present invention pertains comprises a pair of rotor and concave units 16 and 18, said compartments being in side-by-side relationship and divided preferably by a vertical median plate 20 and defined on the top by a semi-cylindrical shell 22 within which rotors 24 rotate, said rotors being provided at least with a pair of rasp bars 26 which are disposed radially outward from the tubular members comprising the rotors 24, said rasp bars defining a cylindrical path within which at least the inner portions of the concaves 28 and concave extensions 30 are complementary.

Power means, which usually is in the form of a diesel engine 32, of relatively high horse power, is mounted in the upper portion of the combine as shown in FIG. 1 in exemplary manner, the same driving by means of belts or sprocket chains 34 a gear 36 which is interconnected by additional belts or sprocket chains 38 with another gear 40 which is connected to a bevel gear that meshes with another bevel gear 42 connected to one end of a drive shaft 44 for rotor 22 of the rotor and concave unit 18, immediately behind which the rotor and concave unit 16 is located, the relative positions of these units also being shown in FIG. 2. The gear 40 is mounted upon a shaft 46 which extends transversely to the longitudinal axis of the combine shown in FIG. 1 and an additional bevel gear is mounted thereon which meshes with another bevel gear 42 fixed to the drive shaft of the rotor and concave threshing unit 16 which is immediately in front of the unit 18 shown in FIG. 1. Preferably, the rotors 24 of said units 16 and 18 are driven in opposite rotary directions as indicated by the directional arrows shown in FIG. 2.

Referring especially to FIGS. 2 and 3, it will be seen that the concaves 28 and concave extensions 30, which are of conventional nature in combines of the type to which the present invention pertains, each comprise a series of radially extending bars 48 and 50 which are circumferentially spaced apart, the bars 48 being of a larger size than bars 50. Also as shown in FIG. 3, it will be seen that a plurality of wires 52 and 54, respectively of different diameters, extend through appropriate holes in the bars 48 and 50, said holes being spaced longitudinally even distances along said bars and the arrangement provides a reticulated configuration of a grid-like pattern of openings through which threshed and some semi-threshed material passes for discharge onto a grain pan 56 which extends transversely between the opposite side plates 57 of the combine which defines the opposite sides of a compartment 58 within which the two rotor and concave units 16 and 18 are disposed, the same being spaced at the outer sides thereof from the side plates 57 to provide spaces within which threshed crop material passing through the openings of the concave extensions 30 are discharged for downward movement by gravity particularly to the portions of the grain pan 56 which are nearest the outer side edges thereof.

It is to be understood that the grain pan 56 may be stationarily mounted within the compartment 58, in which event, the opposite side edges of the grain pan 56 may extend to the inner faces of side plates 57 of the combine. However, if the grain pan is of the type which is mounted for longitudinal reciprocation as shown in said prior U.S. Pat. Nos. 3,626,472 and 3,827,443, suitable limited spacing between the side plates 57 and the opposite side edges of the grain pan are provided.

Referring also to FIG. 2, in which the grain pan 56 is shown in transverse sectional view, it will be seen that said grain pan comprises a series of longitudinally extending strips 60 which defined therebetween, a series of parallel, shallow channels 62 which also extend longitudinally of the grain pan. Further, it will be understood that while the grain pan 56 is referred to as a "grain" pan, it also receives kernels, seeds, and other types of desired threshed crop material and partially or semi-threshed crop material as well as grains thereof. The strips 60 which define the channels 62 prevent any appreciable transverse shifting of the crop material, especially of a major nature, such as when the combine might be operating on sloping terrain, and thereby tend to maintain the crop material which is deposited upon the grain pan is such transversely spaced relationship as it occurs as received from the threshing compartments. However, it has been found that normal discharge of threshed and semi-threshed material from the threshing compartment does not result in consistent relatively even distribution of the material between opposite sides of the grain pan to the degree desired in order to effect maximum operation of the cleaning mechanism of the combine of which the grain pan comprises one part, said mechanism also including sieve mechanism 64 which is disposed rearwardly of and at a level somewhat below the grain pan 56 and onto which the threshed and limited amount of semi-threshed crop material is discharged from the rearward end of the grain pan 56 for further cleaning operation. For further description of the details of the grain pan 56 and sieve mechanism 64, attention is directed to said aforementioned Rowland-Hill prior patents referred to above.

As referred to above, in order to attempt to maximize the substantially even distribution of threshed product material upon the grain pan 56, it is one of the principle objectives of the present invention to provide a plurality of different embodiments of means to accomplish this, all of which embodiments have the same common objective. Essentially, said embodiments all include angularly extending deflecting plates which are supported by the concaves of the threshing units, said various embodiments respectively including deflecting plates of different shapes and employing different mounting means with respect to said concaves. Details of these various embodiments are as follows. It should be pointed out that even though the embodiments discussed hereinbelow all contemplate deflecting plates supported by the concaves of the threshing units, other configurations such as plates supported by the grates in the separating area do not depart from the scope of the invention.

One embodiment of said deflecting means is illustrated in FIGS. 1–3 in which it will be seen that a plurality of similar deflecting plate means 66 are shown, the same comprising a plurality of similar deflecting plate sections 68 which are shown for example in side elevation in FIG. 3. Said plates are substantially rectangular in plan view as shown in FIG. 3 and, as can be seen from FIG. 2, said plates extend downwardly and inwardly toward each other at the lower edges thereof but said lower edges being spaced away from the central longitudinal axis of the grain pan 56, the upper edges thereof terminating in integral attaching flanges 69. These flanges are connected to radially extending attaching members 70 which, as shown in FIG. 3, are in the form of small ears which are fixed to the lower edges of certain of the bars 48 of the concaves 28, said bars being relatively close to the outer side edges of said concaves 28. Said attaching members 70 have holes therethrough for the reception of connecting bolts 72 which also extend through apertures in attaching flanges 69, said apertures being in the form of short slots which permit a limited amount of longitudinal adjustment of the plate sections 68 with respect to each other as well as to the concaves 28 for purposes of effecting further maximum efficiency in the operation of the deflecting function. It also will be understood that the number of the plate sections 68 which are attached to the concaves 28 may be adjusted by adding or subtracting the same in order to effect maximum deflecting efficiency in accordance with particular crops being harvested as well as the condition of any particular crop, the number of said plates and the positions thereof being determined somewhat empirically by the operator of the combine.

From FIG. 2 in particular, it will be seen that the upper, outer edges of the deflecting plate sections 68 are spaced inwardly from the side plates 57 of the combine, particularly for purposes of permitting the discharge of threshed and semi-threshed material through the openings of the concave extensions 30, said material falling by gravity onto the grain pan 56 which receives the material substantially in the outermost shallow channels 62 nearest the opposite sides of the grain pan 56. To insure however that the desired proportion of the threshed and semi-threshed crop material is received in the channels 62 which are respectively on opposite sides of the central longitudinal axis of the grain pan 56, it will be seen that the lower edges of the deflecting plate sections 68 of deflecting means 66 terminate above and substantially midway between said latter shallow channels 62, thereby insuring a relatively even distribution of material in the various channels 62 of the grain pan 56, whereby the threshed and limited amount of semi-threshed material discharging from both of the concaves 28 and their respective concave extensions 30 will be distributed substantially evenly transversely across the entire width of the grain pan 56.

The primary objectives of the invention also may be achieved by another embodiment thereof illustrated in FIGS. 4–6. Referring to FIG. 4, it will be seen that this additional embodiment comprises a single deflecting member 74 which, as will be seen in FIG. 6, comprises an equilateral triangle in plan view, having an apex 76 extending toward the forward end of the combine and preferably spaced a limited distance inwardly from the forward end of the concave 28 as will be seen from FIG. 4. The deflecting member 74 also has a central axis 78 which extends from the apex 76 rearwardly to a point midway between the opposite ends 80 of the edge 82 which is opposite the apex. The deflecting member 74 comprises a metallic plate which is bent along the central axis 78 in a somewhat arcuate manner as shown in FIG. 6 for purposes of providing opposite side portions 84 which are bent at an obtuse angle to each other along said central axis.

For purposes of securing the deflecting member 74 substantially evenly between the threshing units 16 and 18 so that the central axis 78 of said member is in coincidence with the lower edge of the median plate 20 which separates the two threshing units, the opposite side portions 84 of said member are provided with a plurality of apertures which preferably can comprise slots 86 through which bolts 88 extend as shown in FIG. 5, the threaded ends of said bolts being received within tapped holes formed respectively in a pair of the curved connecting plates 90 which extend between and support the bars 48 of the concaves 28, the curved bars 90 being spaced longitudinally apart relative to the longitudinal axis of the rotor and concave threshing units 16 and 18 as shown particularly in FIGS. 3 and 4.

In view of the angularly related side edges 92 of the deflecting member 74 which subtend an acute angle therebetween, and particularly the manner in which the deflecting members 74 are mounted midway between the side-by-side concaves 28 of the threshing unit 16 and 18, it will be seen that as threshed material is discharged through the concaves 28, the material falling from the side edges 92 nearest the apex 76 will be distribued to the central portion of the grain pan 56, whereas the material discharged from the side edges 92 progressively toward the opposite ends 80 will progressively be distributed toward the outer portions of the two channels 62 of the grain pan 56 which are immediately adjacent the central axis of said grain pan and, under such circumstances, the outermost channels 62 of said grain pan will respectively receive threshed material discharging through the concave extensions 30 as well as some from the outermost edge portions of the concaves 28. All of this will result in a substantially even distribution of threshed material onto the grain pan 56 in a transverse manner between the opposite side edges thereof.

A still further embodiment of the invention is illustrated in FIGS. 7 and 8 in which a pair of similar deflecting members 94 which, in plan view are illustrated in FIG. 8. One of said deflecting members 94 is secured to each of the concaves 28 centrally of the bottom surfaces thereof as clearly shown in FIG. 7. The members 94 each comprise a plate formed from steel and having a central longitudinal narrow section 96 which is flat for purposes of directly engaging a pair of the curved connecting plates 90 of the concaves 28 which are spaced longitudinally apart a distance similar to the distance that the apertures 98 are spaced apart in the narrow section 96 of the members 94 as shown in FIG. 8. These apertures preferably are in the form of short slots through which bolts 100 extend as shown in FIG. 7, the threaded ends thereof being received within tapped holes formed in said longitudinally spaced connecting plates 90 of the concaves 28.

From FIG. 8, it will be seen that the forward end 102 of each member 94 is of substantially less length than the rearward end 104 thereof due to the opposite edges of the members 94 having forward, angularly extending side edges 106 which extend between the forward end 102 and extend rearwardly respectively to the forward ends of the parallel side edges 108 of the members 94.

The opposite side portions 110 of the members 94 preferably are disposed at an obtuse angle relative to each other as clearly shown in FIG. 7 but said side portions each extend downwardly and outwardly in equal directions with respect to a vertical plane passing through the central longitudinal section 96 of each of said members as mounted upon the lower portions of said concaves 28. Also, as in regard to the deflecting members 74 of the preceding embodiment, the forward ends 102 of the members 94 are spaced rearwardly from the forward ends of the concaves 28 similarly to the rearward spacing of the apex 76 of the members 74 with respect to the concaves 28 as shown in FIG. 4.

Due to the foregoing arrangement of the members 94 with respect to the concaves 28 of the side-by-side rotor and concave units 16 and 18, as well as the shape of the members 94, said members will serve to distribute threshed material in a substantially even manner transversely between the opposite side edges of the grain pan 56 since it will be noted that the adjacent parallel side edges 108 of the members 94 are spaced transversely apart as clearly shown in FIG. 7 and, further, the outermost side edges 108 of the members 94 also are spaced appreciable distances from the side plates 57 of the combine, the latter arrangement permitting the threshed material discharged from the concave extensions 30 to fall into the outermost channels 62 of the grain pan 56, as well as some of the material discharging from the forward portions of the concaves 29 likewise being permitted to fall into said outermost channels due to the narrower forward end 102 of the members 94 and the angular side edges 106 of said member, whereas material from the innermost sides of each of the concaves 28 will fall upon the innermost side portions 110 of members 94 and be deflected toward the channels 62 of the grain pan 56 which respectively are directly on opposite sides of the central strips 60 of said grain pan.

From the foregoing, it will be seen that the present invention provides relatively simple and readily installed deflecting members comprising a plurality of embodiments of the invention some of which are shown in the foregoing figures as described above, all for the common purpose of distributing threshed crop material, as discharged in the exemplary embodiments from the concaves and concave extensions of the threshing unit in a substantially even manner transversely across the grain pan of the combine for substantially the full width thereof. Such even distribution also is extended to the discharge of threshed material from said grain pan onto the sieve mechanism which, together with the grain pan 56 comprises the cleaning mechanism of the combine. Such even distribution provides maximum efficiency without overloading any particular area of said cleaning mechanism to any substantial extent more than other areas thereof, whereby said mechanism functions to maximum efficiency.

The foregoing description illustrates preferred embodiments of our invention. However, as mentioned above, the concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. A mobile combine having a longitudinally extending unit comprising threshing and separating means and including coacting rotor and concave members, crop feeding means on the forward end of said combine operable to deliver cut crop material to said threshing and separating means, material cleaning mechanism comprising a grain pan supported below said threshing and separating means to receive threshed and semi-threshed material therefrom and sieve mechanism supported by said combine rearwardly of said grain pan to receive material therefrom for separation of threshed crop material from waste material, and power means operable to actuate said feeding means and threshing means; the improvement comprising material deflecting means positioned beneath at least portions of said threshing and separating means, and means connecting said deflecting means to said longitudinally extending unit for direct support thereby, said deflecting means being operable to effect relatively even distribution of crop material in a transverse direction across said material cleaning mechanism.

2. The combine according to claim 1 in which said deflecting means are supportably connected to said concave member.

3. The combine according to claim 2 wherein said deflecting means are supported below said concave member.

4. The combine according to claim 3 in which said material deflecting means comprises a pair of related surface means respectively extending downward in similar opposite angular directions and operable to effect said aforementioned relatively even distribution of crop material in opposite directions from the central axis of said material cleaning mechanism.

5. The combine according to claim 3 in which said threshing means comprise a pair of coacting rotor and concave units in side-by-side relationship and said units being co-extensive in length with each other, said deflecting means being equally arranged respectively below said units, and said material cleaning mechanism extending transversely evenly beneath said pair of threshing units for substantially the full width thereof.

6. The combine according to claim 5 in which said combine has opposite side plates defining the transversely opposite sides of a compartment and said pair of threshing units being mounted within said compartment respectively in limited spaced relation to said side plates, said cleaning mechanism extending transversely substantially to said side plates and the grain pan of said cleaning mechanism having a plurality of longitudinally extending divider strips spaced transversely across said pan to define a series of shallow channels, and said deflecting means comprising plates disposed angularly to each other above said grain pan and operable to distribute crop material substantially evenly respectively to said shallow channels.

7. The combine according to claim 5 in which said material deflecting means comprises a pair of similar plate means and said concaves each have similar support members extending longitudinally thereof and respectively spaced inwardly from the outer edges of said concaves, and means connecting one edge of each plate means respectively to said support members and said plate means respectively extending downward and inward from said support members toward each other and said grain pan and the lower edges of said plate means being spaced respectively from the central longitudinal axes of said grain pan.

8. The combine according to claim 7 in which said concaves each have similar portions extending in opposite directions laterally outward beyond said support members through which threshed crop material is discharged to fall by gravity onto the portions of said grain pan nearest the side edges thereof, whereby threshed crop material discharged through the inner portions of said concaves is deflected by said deflecting members toward the central portions of said grain pan to effect approximately even distribution of material across substantially the full width of said grain pan.

9. The combine according to claim 7 in which said concaves are composed of a series of longitudinally extending bars spaced apart transversely and a series of wires extending between said bars in longitudinally spaced relationship along said bars, one of said bars intermediately between the opposite edges of each concave having said support member connected thereto and extending downward therefrom.

10. The combine according to claim 9 in which deflecting plate means comprise a series of similar sections each having an attaching flange along one edge disposed at an angle to said plate sections, said flanges having a plurality of longitudinally spaced apertures therein, and bolt means extending through said apertures and holes provided in said support members to firmly connect said plate sections to said concaves.

11. The combine according to claim 10 in which apertures comprise longitudinally extending slots to permit limited longitudinal adjustment of said plate sections relative to each other and said concaves.

12. The combine according to claim 5 in which said deflecting means comprise plate means having opposite side edges arranged at an acute angle to each other and at similar angles to the central longitudinal axis of said plate means to form an apex at one end, said plate means having the opposite side portions bent at an obtuse angle to each other along the central axis thereof, and means connecting said plate means to said side-by-side concaves with the central axis of said plate means coincident with a vertical median plane between said concaves, the apex of said plate means being forwardmost and the opposite side portions thereof extending similarly downward and outward to effect said aforementioned relatively even distribution of crop material transversely across said grain pan.

13. The combine according to claim 12 in which said plate means is a substantially equilateral triangular plate having said central longitudinal axis extending from the apex of said plate to the midpoint of the edge opposite said apex, the opposite side portions of said plate having apertures therein at longitudinally spaced locations, and fastening means extending through said apertures and connected to said concaves adjacent the inner edges thereof.

14. The combine according to claim 13 in which the apex of said plate is spaced a predetermined distance from the forward ends of said concaves and the ends of the rearward edge of said plate being substantially in vertical alignment substantially with and below the axes of the rotors of said rotor and concave units, whereby threshed material is spread progressively in opposite transverse directions from the angularly related side edges of said plate onto said grain pan in said aforementioned relatively even distribution transversely across said grain pan.

15. The combine according to claim 5 in which said deflecting means comprise a pair of similar plates having longitudinal central axes and said plates being bent along said axes to provide a pair of angularly related side portions, and means connecting said plates respectively to the lower mid-portions of each concave and the side portions of each plate extending downward and outward in substantially equal directions from said lower mid-portions of said concaves.

16. The combine according to claim 15 in which the forward ends of said side portions of said plates are narrower than said rearward portions of said plates and the width of the rearward ends of said plates respectively being less than the horizontal width of said concaves.

17. The combine according to claim 16 in which the rearward portions of the side edges of said plates are substantially parallel to each other for approximately half the length of said plates.

* * * * *